United States Patent [19]

Aberson, Jr. et al.

[11] Patent Number: 4,880,291

[45] Date of Patent: Nov. 14, 1989

[54] OPTICAL FIBER CONNECTOR AND METHODS OF MAKING

[75] Inventors: James A. Aberson, Jr., Atlanta; George F. DeVeau, Stone Mountain; Kenneth M. Yasinski, Ellenwood, all of Ga.

[73] Assignee: American Telephone & Telegraph Company, AT&T Bell Laboratories, Murray Hill, N.J.

[21] Appl. No.: 152,279

[22] Filed: Feb. 4, 1988

[51] Int. Cl.⁴ .............................................. G02B 6/38
[52] U.S. Cl. .............................. 350/96.21; 350/96.20
[58] Field of Search ............... 350/96.20, 96.21, 96.22, 350/320

[56] References Cited

U.S. PATENT DOCUMENTS

| | | | |
|---|---|---|---|
| 3,936,143 | 2/1976 | Sato | 350/96.21 |
| 4,545,644 | 10/1985 | Deveau, Jr. et al. | 350/96.21 |
| 4,634,214 | 1/1987 | Cannon, Jr. et al. | 350/96.20 |
| 4,691,986 | 9/1987 | Aberson, Jr. et al. | 350/96.21 |
| 4,738,507 | 4/1988 | Palmquist | 350/96.21 |
| 4,738,508 | 4/1988 | Palmquist | 350/96.21 |

Primary Examiner—William L. Sikes
Assistant Examiner—Phan T. Heartney
Attorney, Agent, or Firm—E. W. Sommers

[57] ABSTRACT

In an optical fiber connector in which each of two optical fibers (21-21) is terminated by a plug (40) having a passageway (41) for receiving an end portion of the optical fiber, eccentricity of one fiber end relative to the other is reduced by causing each optical fiber to be mounted in a specified orientation with respect to its associated plug passageway. In one embodiment, because the two cylindrical plugs which are used in the connector are derived from contiguous segments (111-111) of length of tubular stock, because the plugs are arranged so that the contiguous ends of the plugs before separation from the stock become the mating ends in the connection and because the plugs after separation from each other have the same rotational orientation with respect to each other as before, the predetermined orientation of the fiber ends in the plug passageways of the two adjoining plugs prior to separation of the segments from the stock reduces substantially any eccentricity which otherwise would be caused by the random mounting of the fibers in the associated passageways.

23 Claims, 6 Drawing Sheets

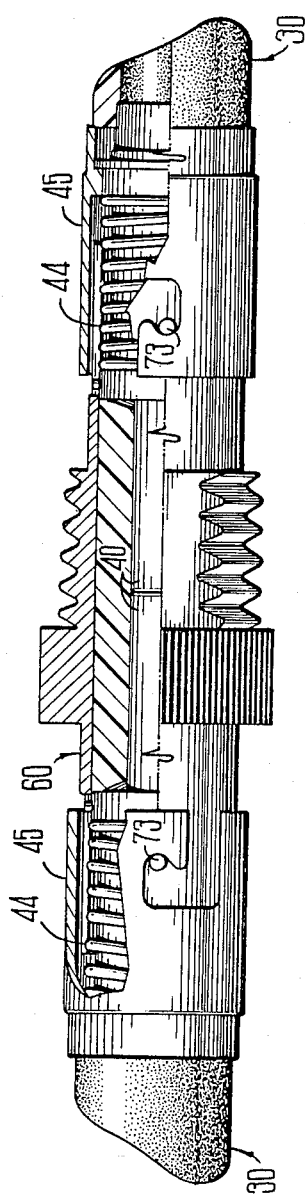
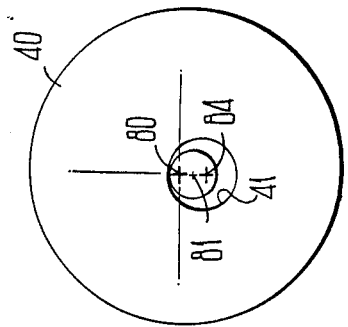
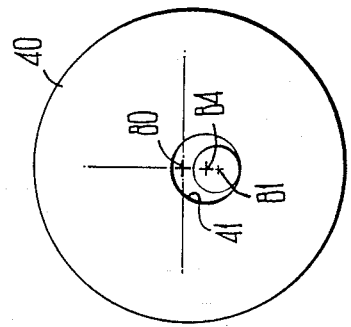
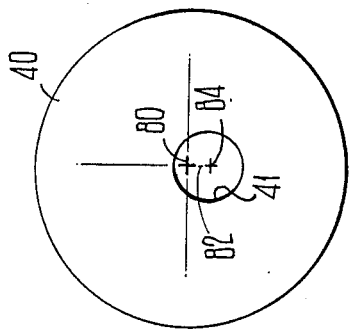
FIG. 7
FIG. 8
FIG. 9
FIG. 10

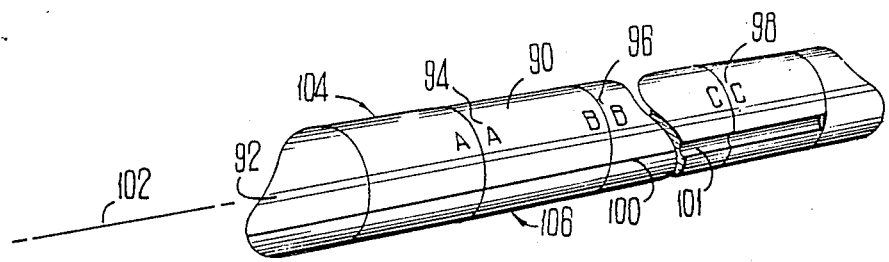
FIG. A1
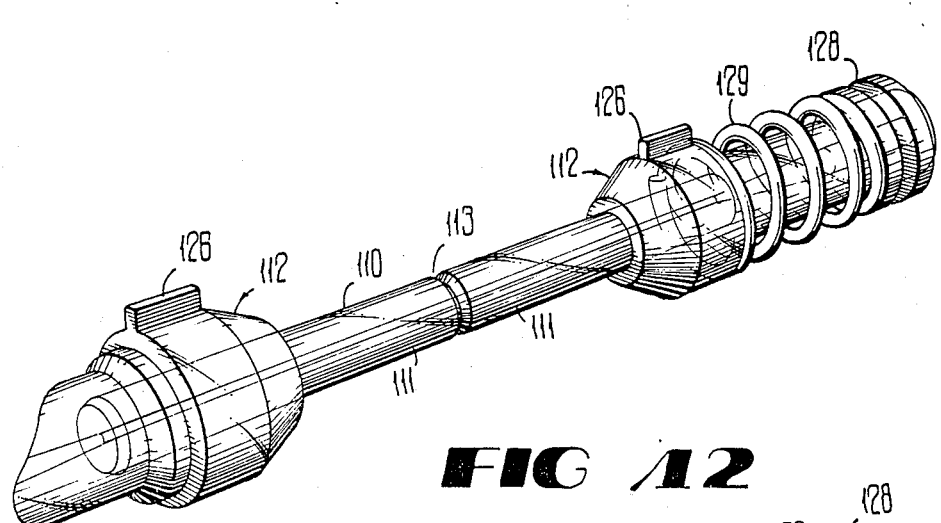
FIG. A2
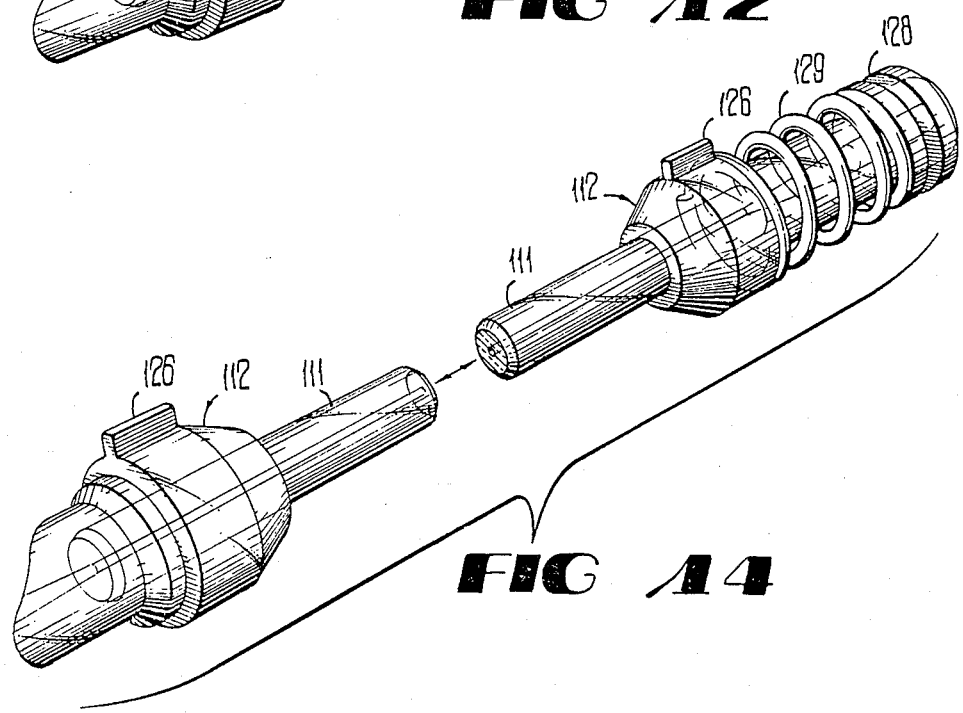
FIG. A4

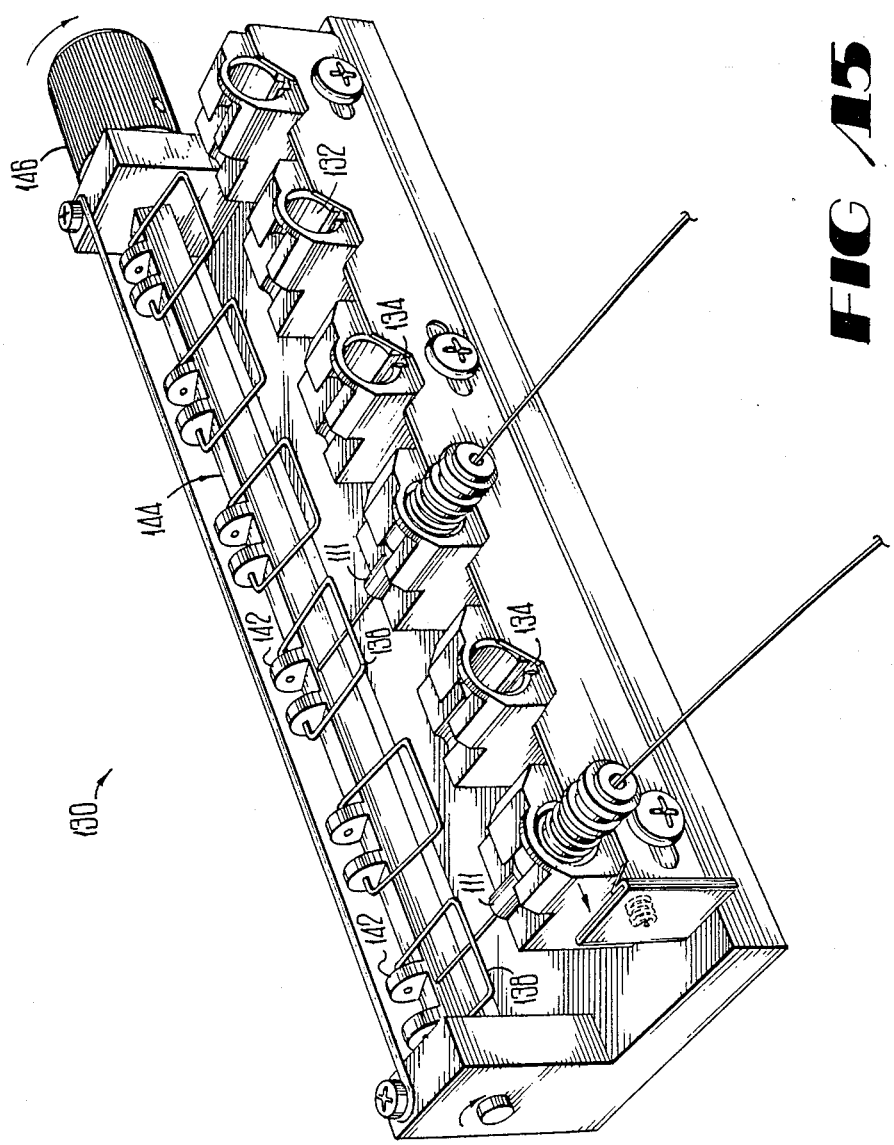

OPTICAL FIBER CONNECTOR AND METHODS OF MAKING

TECHNICAL FIELD

This invention relates to an optical fiber connector and to methods of making same. More particularly, it relates to an optical fiber connector having reduced eccentricity of an optical fiber terminated by one plug with respect to an optical fiber terminated by another plug.

BACKGROUND OF THE INVENTION

Optical fiber connectors and splices are an essential part of optical fiber communications systems. Connectors may be used to join lengths of optical fiber into longer lengths, or to connect optical fiber to active devices such as radiation sources, detectors, or repeaters, or to passive devices such as switches or attenuators.

An optical fiber connector must meet at least two requirements. It must couple or join two optical fibers with minimum insertion loss. Secondly, it must provide mechanical stability and protection to the junction between the optical fibers in the working environment. Achieving low insertion loss in coupling two optical fibers in generally a function of the alignment of the optical fiber ends, the width of the gap between the ends, and the optical surface condition of the ends. Stability and junction protection is generally a function of connector design, such as, for example, the minimization of differential thermal expansion effects.

Many approaches to achieving fiber alignment can be found in the prior art. Among them are V-grooves, resilient ferrules, and conical bushings. A discussion of prior art connectors is provided in R. Schultz, *Proceedings of the Optical Fiber Conference*, Los Angeles (September 1982), pp. 165–170.

Some prior art optical fiber connectors contain one or more precision-machined parts and therefore are relatively costly items. Whereas this may be acceptable for some applications, in other cases the cost of such prior art connectors might constitute a significant fraction of the total installation cost. Thus, strong incentives exist for providing optical fiber connectors that do not require expensive precision-machined parts.

A further consideration in connector design is the relative ease of field installation of the connector. It is desirable that a sought-after connector be capable of being installed within a relatively short period of time without requiring special skills or manipulations not easily carried out in the field.

A prior art connector which has many of the above-listed desirable features includes two drawn glass cylindrical plugs, with a fiber end portion inserted into a close-fitting passageway of each plug, and the connection between the two fiber ends made by inserting the plugs in end-to-end fashion into an alignment sleeve that maintains the outer surfaces of the two plugs in registry. This connector design relies on the capability of producing plugs to very close tolerances by drawing them from a glass preform. Relative rotation of the two plugs typically changes the relative position of the fibers held within the passage way because of the eccentricity of the optical fiber core with respect to the plug. Eccentricity is defined as the distance between the longitudinal centroidal axis of the plug at an end face of the plug and the centroidal axis of the optical fiber core held within the passageway of the plug. Generally, the passageway is not concentric with the outer cylindrical surface which is the reference surface. Also, the optical fiber may not be centered within the plug passageway and the fiber core may not be concentric with the outer surface of the fiber. Hence, the eccentricity is comprised of the eccentricity of the optical fiber core within the optical fiber, the eccentricity of the optical fiber within the plug passageway and the eccentricity of the passageway within the plug;

Because it is very difficult to control the eccentricity of the optical fiber core in the plug in which it is terminated, it is difficult to achieve desired losses of 0.1 dB or less in single mode fibers without maintaining close tolerances so that the opposed cores are aligned to within about 0.7 μm. This, of course, increases manufacturing costs.

Another prior art connector that has many of the above-listed desirable characteristics is disclosed in U.S. Pat. No. 4,545,644 which issued on Oct. 8, 1985 in the names of G. F. DeVeau, Jr. and C. M. Miller. That patent discloses an optical fiber connector comprising two cylindrical plugs with axial passageways into which the optical fiber end portions are inserted, with the plugs then inserted into an alignment device. The alignment device comprises a plurality, typically three, of cylindrical alignment rods, and facilities such as a spring clip for maintaining the alignment rods in contacting relationship with both plugs. At least one of the alignment rods is provided with a "flat" region of different curvature extending from one of the ends of the rod towards the middle, where a small amount of rod material has been removed to create a small offset. One or more flat-caring alignment rods can be used to introduce deliberately an eccentricity into the plug alignment. The rotation of one plug with respect to the other eliminates substantially misalignment between the fiber cores. Relative rotation between the two cylindrical plugs changes the relative position of the optical fiber end portions held within them.

If the total eccentricities of the two optical fiber ends to be joined are identical or at least very nearly so, then a low-loss connection can be achieved by merely rotating, within the alignment sleeve, one plug with respect to the other, until maximum coupling is observed. This is very often possible with mated cylindrical plugs originating from adjacent segments of the same drawn glass tubular stock. In U.S. Pat. No. 4,691,986 which is issued on Sep. 9, 1987 in the names of Aberson, et al., two plugs are made by a process that includes dividing a length of tubular stock into a plurality of segments, each segment corresponding to a plug. Contiguous end faces of two segments along the stock become opposed end faces for two plugs. Facilities are provided so that after optical fibers have been terminated by two contiguous plugs, the plugs are capable of being assembled in their preseparated relative positions. This arrangement has been referred to as a prealigned rotary splice.

Central to the so-called prealigned rotary splice is the recognition that eccentricity between plug passageway and plug cylindrical surfaces essentially will have no effect on alignment of fibers terminated by two plugs if the two plugs have essentially the same amount of passageway eccentricity relative to the cylindrical surfaces and if the plugs are aligned such that the eccentricities are in the same radial direction from a centroidal axis of the plugs. This is achieved if contiguous plugs are arranged so that the contiguous faces prior to separation from the tubular stock become the end faces of the plugs, and if the plugs are aligned rotationally to have substantially the same angular relationship that existed between the two contiguous segments prior to their separation. However, even with mated pairs it has not always been possible to achieve connections having losses less than 0.1 dB, because achievement of such a low-loss level typically requires alignment of the fiber ends to within less than about 1 μm.

With the use of the prealigned rotary splice, loss due to eccentricity of the bore with respect to the plug has been overcome substantially. Also, by means of the rotary splice, the problem of loss due to offset of optical fiber cores has been overcome. Remaining is the loss due to random disposition of the optical-fiber end portion in the passageway of the plug. This is overcome to a large extent by making the plug so that the transverse cross-section of the passageway therein is equal substantially to the transverse cross section of the optical fiber to be received therein. Of course, this requires precision plug manufacture and higher costs than if the cross section of the plug passageway was not so critical.

What is desired and seemingly what is not available in the prior art is an optical fiber connector in which the loss due to random positioning of the optical fiber in the plug passageway is overcome. If this problem were to be overcome, it is believed that any loss of optical fiber connections through the use of the prealigned rotary splice would be reduced substantially, possibly to a level as low as 0.05 dB.

SUMMARY OF THE INVENTION

The foregoing problems of the prior art have been overcome by the optical fiber connector of this invention and by the methods of and apparatus for making a connection. An optical fiber connector comprises first and second plugs with each plug having a passageway therethrough for receiving an end portion of an optical fiber. Each passageway has a cross-section transverse to a longitudinal axis of the plug which is significantly larger than that of the optical fiber to be received therein. A first optical fiber has an end portion which is received in the passageway of the first plug and a second optical fiber has an end portion which is received in the passageway of the second plug. Each of the fiber end portions is disposed in an associated passageway intentionally in the same orientation with respect to the associated passageway of the associated plug. Also provided are facilities for maintaining the outer surface of the first plug aligned substantially with the outer surface of the second plug.

In a preferred embodiment, two plug segments to be used in a connection are provided from contiguous portions of the same tubular preform. Prior to separation of the plug portions from the preform, the free end portion of each plug segment is mounted in a connector body. Each connector body is provided with a tab and the connector bodies are attached to the plug segments so that the tabs on the connector bodies are aligned longitudinally. As a result, if after the plug segments have been separated, the plug end faces that were contiguous before separation are caused to be adjacent to each other, and the tabs aligned longitudinally, not only will the passageways of the two plugs be aligned but also the fibers adjacent to corresponding portions of the peripheries of the two plugs will be aligned.

In another embodiment of making an optical fiber connector, the eccentricity of a passageway with respect to a longitudinal axis of the plug is determined. Then an end portion of an optical fiber is inserted into the passageway of the plug such that the fiber is positioned in the passageway in a predetermined orientation with respect to the direction of eccentricity of the passageway relative to the plug. Preferably, the optical fiber is positioned in the passageway and secured therein to be oriented in the direction of eccentricity of the passageway relative to the longitudinal axis of the plug. Two such plugs are mounted in an alignment device such that the direction of eccentricity of one plug is aligned longitudinally with that of the other plug.

An apparatus is used to provide a terminated plug in which an end portion of an optical fiber is disposed in a passageway of the plug in a predetermined orientation with respect to a marking on the plug which may correspond to the direction of eccentricity of the passageway relative to the longitudinal axis of the plug. The apparatus includes a plurality of nests each adapted to receive a plug and a connector body of an optical fiber connector. In a preferred embodiment, each of two contiguous plug segments of a common preform is mounted in a connector body having a tab projecting therefrom prior to separation from the preform such that the tabs are aligned longitudinally. The plugs are separated from each other and inserted into individual nests in the apparatus. An optical fiber end portion is inserted into the passageway of each plug and the apparatus is operated to cause a fiber end portion which has been inserted into the plug passageway to be moved in the direction of the tab to engage the wall of the plug passageway wherein it is secured.

BRIEF DESCRIPTION OF THE DRAWING

Other objects and features of the present invention will be more readily understood from the following detailed description of specific embodiments thereof when read in conjunction with the accompanying drawings, in which:

FIG. 7 is an elevational view of partially in section of the connection arrangement of FIG. 6;

FIG. 8 is an end view which shows a plug having an eccentrically located passageway, the eccentricity being exaggerated for purposes of clarity;

FIG. 9 is an end view of the plug of FIG. 8 with an optical fiber disposed therein;

FIG. 10 is an end view of the plug of FIG. 8 with an alternate mounting of an optical fiber therein;

FIG. 11 depicts schematically a length of tubular stock comprising several plug segments;

FIG. 12 depicts a two plug segment portion of tubular stock prior to separation and having rotational identification means;

FIG. 14 depicts the two segment portion of the stock of FIG. 12 after separation;

FIG. 15 shows an apparatus which is used to provide the connective arrangement of this invention.

DETAILED DESCRIPTION

Figure 1:
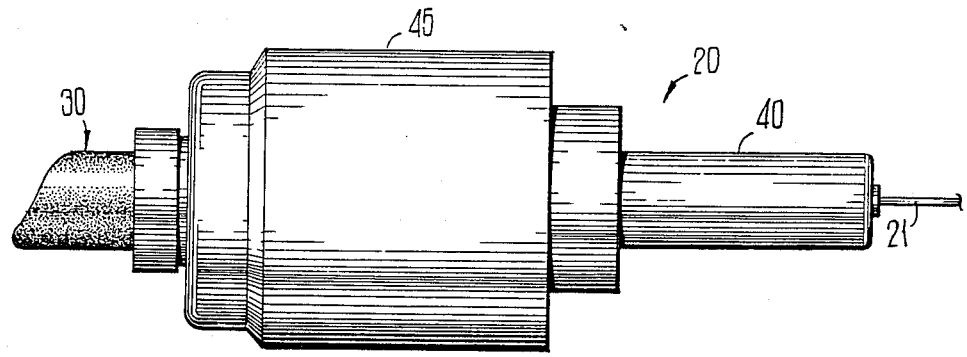
FIGS. 1 and 2 are side elevational views, one partially in section, of a plug assembly of the optical fiber connector of this invention.
Figure 2:
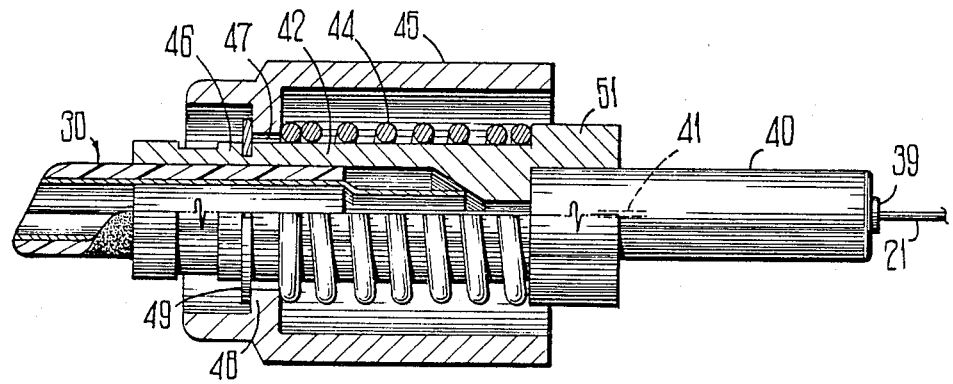
Figure 3:
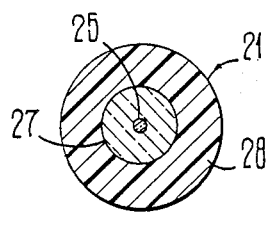
FIG. 3 is an end sectional view of an optical fiber.
Figure 4:
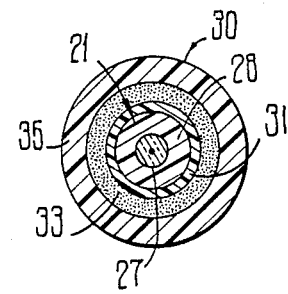
FIG. 4 is an end section view of an optical fiber cable to be terminated by the connector of this invention.

Referring now to FIGS. 1 and 2 there is shown a portion of an optical fiber connector 20 for providing an optical fiber connection between two optical fibers 21—21. The connector 20 is exemplary and others may include the arrangement of this invention. Each of the optical fibers 21-21 (see FIG. 3) includes a core 25 and a cladding 27 enclosed in a coating 28. The optical fiber may be enclosed in a tube of polyvinyl chloride (PVC) to provide what is referred to as a buffered fiber which may be terminated and connected in accordance with this invention. The connective arrangement of this invention also may be used to connect single fiber cables 30—30 (see FIG. 4) in which covering a tube 31 of PVC is a strength member 33 such as one made of Kevlar ® fibrous material, for example, and an outer jacket 35 which may be comprised of PVC.

Figure 5:
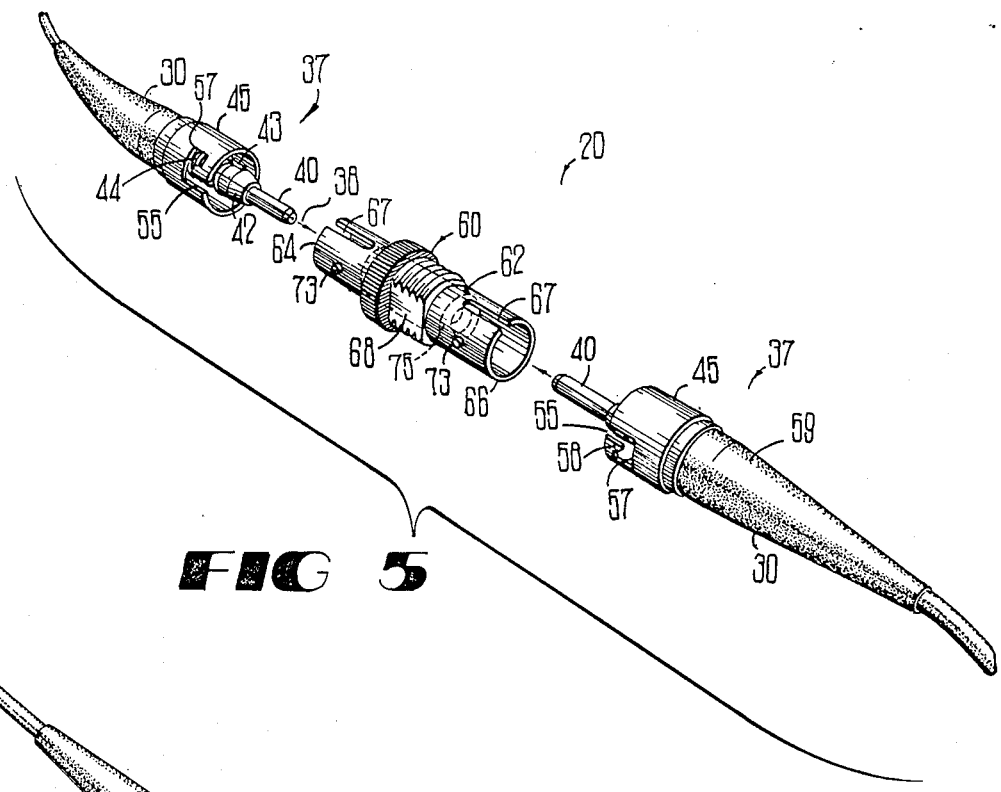
FIG. 5 is a perspective view of a optical fiber connection arrangement which includes two terminated optical fibers of this invention.
Figure 6:
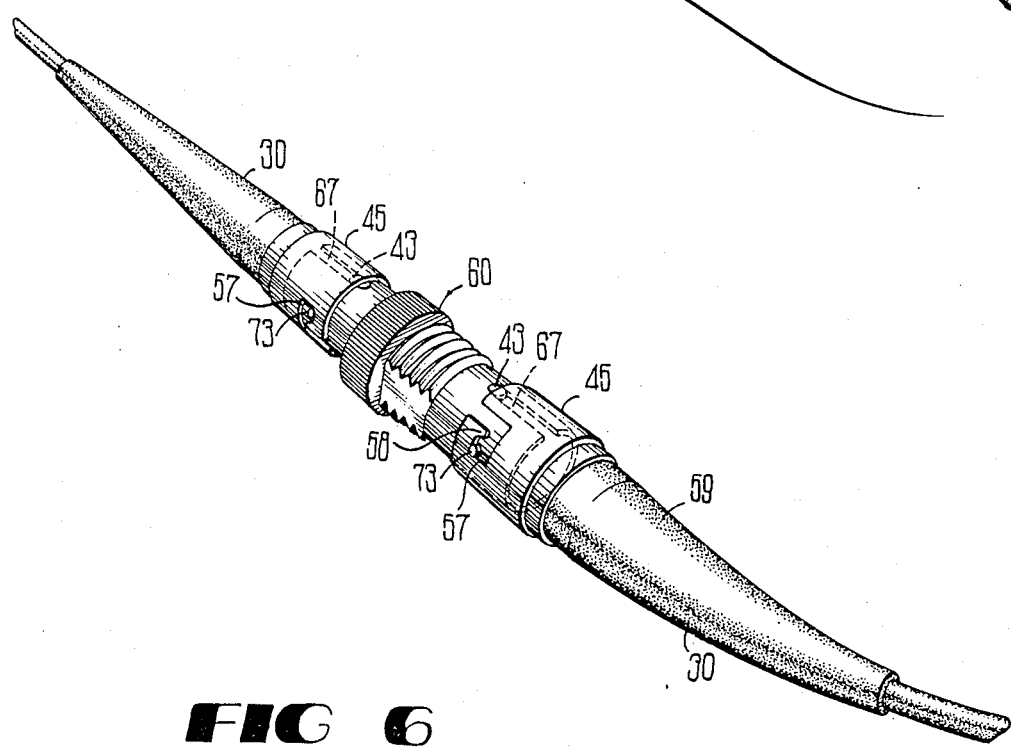
FIG. 6 is a perspective view of two plug assemblies connected together through a coupling.

Referring to FIGS. 5-6, it can be seen that the connector 20 comprises two optical fiber terminations, each designated generally by the numeral 37. Corresponding elements of the terminations 37—37 are identified with the same numerals. The connector 20 is such that longitudinal axes 38—38 of the terminations are coaxial. In addition to an end portion of an optical fiber 21, each termination 37 comprises an optical fiber terminus of plug 40, having a passageway 41 (see FIG. 2) and being made of a glass or ceramic material. The plug 40 has an outer diameter of about 2500 microns. An end face 39 of the plug 40 includes an opening of the passageway 41.

In terminating a cable 30, the coating 28, as well as the tube 31, strength member 33 and outer jacket 35, is removed from an end portion of an optical fiber 21 prior to its termination with a plug 40. Then the uncoated end portion of the optical fiber is inserted into the passageway 41 of each plug 40. The end portion of the optical fiber 21 is secured within the passageway 41 of the plug 40 in accordance with this invention and the end faces of the optical fiber and of the plug are ground and polished.

Each termination also includes a connector body 42 (see FIGS. 2 and 5) made of a plastic or metallic material, a compression spring 44 and a tubular housing 45 made of a metallic material. It should be observed that the plug 40, the connector body 42 and the housing 45 each has a cylindrical cross-section. The connector body 42 includes a separate orienting pin or tab 43 (see FIG. 5) which projects radially from the longitudinal axis 38 and which can be installed at any of an infinite number of positions.

The connector body 42 includes a small diameter portion 46 (see FIG. 2) which extends through an opening 47 in an internally disposed collar 48 in the housing. A retaining washer 49 circumscribes the small diameter portion on the outer side of the collar. The spring 44 is disposed about the smaller diameter portion 46 of the connector body 42 between the collar and a large diameter portion 51. As a result of this arrangement, the spring 44 biases the connector body 42 outwardly from the cable to hold the connector body within the housing 45.

Viewing again FIG. 5, it can be seen that the housing 45 includes a longitudinally extending slot 55 which at its inner end communicates with a circumferentially extending slot 57. The slot 57 is formed so that the tubular wall of the housing which defines it includes a latching projection 58. These slots 55 and 57 are used for securing a termination 37 to another portion of the connector 20.

Completing the connector termination 37, there is shown a portion 59 which may extend from the housing 45 along the optical fiber cable in a conically shaped configuration. This portion of the connector 20 provides strain relief for the termination and ensures that the cable can withstand repeated bends in use after interconnection with another cable without undue stresses being imparted to the optical fibers.

In accordance with this invention, steps are taken to reduce loss attributed to eccentricity of the optical fiber within the plug passageway 41 when the transverse cross section of the plug passageway may be significantly larger than that of the optical fiber to be received therein. The term significant is meant to characterize a plug passageway which may have a diameter that is as much as about 6 microns larger than the diameter of the optical fiber receiving therein.

This is accomplished first by determining the eccentricity of the passageway 41 of each plug 40 with respect to a longitudinal centroidal axis 80 (see FIG. 8) of the plug. In most plugs, such eccentricity is unavoidable during manufacture and the passageway centroid in an end face of the plug is disposed along a radial line 82 from the longitudinal centroidal axis 80 of the plug (see FIG. 8). After the eccentricity has been determined, the direction of eccentricity, that is the radial line 82 along which the passageway centroid 84 is disposed, is indicated on the periphery of the plug such as with the pin or tab 43.

Afterwards, an optical fiber 21 is prepared for termination with the plug 40 by removing the coating from an end portion of the fiber. The end portion of the optical fiber is then inserted and secured in one of the plugs having a designated direction of eccentricity by suitable means such as, for example, by an adhesive, preferably a UV-curable adhesive. The portion of the optical fiber which protrudes from an end face of the plug is scribled and broken after which the optical fiber and plug end faces are polished by techniques well known in the art.

In accordance with this invention, the optical fiber end portion is caused to be disposed within the passageway 41 in a predetermined orientation with respect to the direction of eccentricity of the passageway in which it is disposed. In a preferred embodiment, the end portion of the optical fiber, which has a centroidal axis in an end face designated by the numeral 81, is caused to be biased in the oversize passageway toward the outside of the plug in the direction of eccentricity (see FIG. 9). Of course, it should be understood that the predetermined orientation could be such that the optical fiber is biased against the wall of the passageway in a direction opposite to the direction of eccentricity (see FIG. 10), or for that matter at any angle thereto. What is important is that each plug which is used in the connection have the optical fiber end portion in its associated passageway in the same orientation with respect to the direction of eccentricity as that of the plug to be connected thereto. That orientation may be predetermined by determining the direction of eccentricity of the plug passageway prior to securing the optical fiber end portion therein.

In each plug assembly, the direction of eccentricity is indicated on the exterior of the plug body or on the cap. When the plug assemblies are connected, the connection is made to cause the markings to be aligned longitudinally.

Each of the connector bodies 42—42 and termini or plugs 40—40 is adapted to be received in a coupling designated generally by the numeral 60 (see FIGS. 5 and 6). The coupling 60 includes a tubular member 62 having end portions 64 and 66 with each end portion including a longitudinally extending slot 67. In order to allow the connector 20 to be panel-mountable, the coupling 60 includes a center portion 68 which is threaded and which is adapted to be inserted into a hole (not shown) in a panel. Also included in the coupling 60 at each end portion 64 and 66 thereof are assembly pins 73—73 which are displaced circumferentially from the slot 67 at that end.

In assembling the connector 20 which is shown in FIG. 5, an installer panel-mounts the coupling 60 or otherwise positions it to receive the terminations 37—37. Mounted within the coupling 60 is a sleeve 75. The sleeve 75 is adapted to receive the plugs 40-40 of the terminations 37—37 and is a means for aligning the outer surfaces of the plugs. The sleeve 75 is disposed within the coupling 60 such that it floats to allow for some movement of the plugs 40—40 when they are inserted into the coupling. Further, the sleeve 75 causes the longitudinal axes 38—38 of the plugs 40—40 mounted therein to be coaxial.

The installer, in assembling the connector 20, inserts the plug 40 of one of the terminations 37—37 into the sleeve 75 with the pin 73 of the coupling being received in the longitudinally extending slot 55 of the termination. At the same time, the installer has caused the pin 43 which extends radially from the connector body 42 of the one termination 37 to be received in a longitudinal slot 67 of the coupling 60. The movement of the plug 40 is discontinued when the pin 43 engages an inner end of the wall which defines the slot 67. Continued movement of the housing 45 against the bias of the spring 44 causes the housing to override the connector body. When the pin 73 at the one end of the coupling 60 reaches an inner end of the longitudinally extending slot 55, the operator turns the housing 45 to cause the pin 73 to become disposed and secured within the circumferentially extending slot 57 behind the latching portion 58 (see FIG. 6). It should be observed that the housing 45 is free to turn about the plug 40 and its associated connector body 42. This allows the housing 45 to be turned independently of the connector body 42 to cause the pin 73 to become disposed behind the latching portion 58.

After these steps, the installer repeats the procedure with respect to the other termination 37 to cause the plug 40 thereof to be received within the floating sleeve 75. The geometries of the coupling 60 and of the terminations 37—37 are such that when the plugs 40—40 are received within the floating sleeve 75, and the pins 43—43 bottomed out in the slots 67—67 of the coupling 60, end faces of the plugs 40—40 abut each other (see FIG. 7). Also, with the pins 43—43 aligned, the optical fiber end portions have the same predetermined orientation with respect to the plug passageways. As a result, transmission losses through the connector 20 are minimized.

In a preferred embodiment, the plugs are made with the passageways having a diameter in the range of about 126-131 microns to accommodate optical fiber having an outer diameter of 125 microns. This contrasts with prior art plugs in which the passageway diameter was specified to be in the relatively narrow range of 126-128 microns. As a result of this increased tolerance in passageway diameter, costs are reduced.

In the preferred embodiment, the plugs are those of a prealigned rotary spice connector disclosed and claimed in priorly identified U.S. Pat. No. 4,691,986, which is incorporated by reference hereinto. Plugs to be used in a connector are made from contiguous portions of a length of tubular stock 90 having a bore 92 (see FIG. 11). As can be seen in FIG. 11, there are markings 94, 96 and 98 by which contiguous end faces of contiguous plug segments can be identified at a later time. The tubular stock 90 also includes means for identifying the angular relationship between contiguous plugs, such as a line 100 or a groove 101 (see FIG. 11) that extends parallel to a longitudinal axis 102 of the stock. The line or groove 100 need not extend the lengths of the segments. Instead, the angular relationship between a contiguous pair of plug segments can be identified by means of a short line that crosses the boundary between the segments. Such a line also would serve to identify the contiguous ends of contiguous plug segments. Further, although in the currently preferred embodiment, the plug segments are drawn glass, the invention is not so limited and the tubular stock may be made from any suitable material including ceramic, plastics or metal, for example, and shaped by processes other than drawing.

Two plug segments 104, 106 which are contiguously located in the tubular stock are used for a connector. Care also is taken that the end faces of the plug segments in which the optical fibers terminate are contiguous prior to separation of the plug segments from the tubular stock. The rotational markings on the plug segments permit rotational alignment of the plugs after termination.

Figure 13:
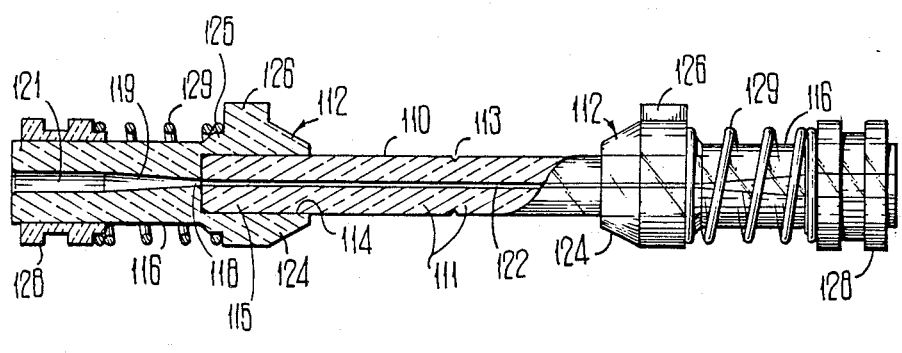
FIG. 13 is a side elevational view partially in section of the two plug segment arrangement of FIG. 12.

The preferred embodiment of this invention will be described with respect to FIGS. 12 and 13. Therein, a preform 110 of drawn glass comprising two plug segments 111—111 is terminated at each of its ends by a housing 112 which typically is made of a plastic material such as polycarbonate. It should be observed that the preform has a circumferential V-groove 113 formed about it center plane. The housing 112 includes a cavity 114 for receiving an end portion 115 of the preform and includes a small diameter portion 116. The small diameter portion 116 includes a passageway 118 which communicates with a tapered transition 119 from an enlarged passageway 121. The enlarged passageway 121 is adapted to receive an end portion of a buffered optical fiber to be terminated and from an end portion of which the buffer layer has been removed to expose and end portion of optical fiber. When the buffered optical fiber is received in the enlarged passageway 121, the exposed portion of the optical fiber extends through the transition section 119 and passageway 118 into a passageway 122 of plug segment 111.

The housing 112 also includes an enlarged portion 124 which is provided with a tab 126. During assembly of the housings 112—112 onto the end portions of the preform 110, the housings are turned to cause the tabs to be aligned longitudinally.

Over a free end of each small diameter portion 116 is positioned a collar 128. A compression spring 129 is disposed concentrically about the small diameter portion 116 between the collar 128 and the enlarged portion of the housing and is adapted to snap-lock over a lip 125 of the housing 112.

Afterwards, two of the marked plug segments 111—111 with housing 112—112 mounted thereon are separated from each other along the circumferential groove 113 and are used to terminate two optical fibers (see FIG. 14). As emphasized hereinbefore, the terminations are such that the end faces in which the optical fibers terminate were contiguous to each other when the plug segments were unseparated portions of the stock (see FIG. 12).

Also, the terminations are carried out so that each fiber end portion is disposed within its associated plug passageway in a predetermined orientation with respect to the direction of eccentricity of the passageway. In the preferred embodiment, the end portion of each optical fiber is inserted into the passageway 122 of its associated plug segment 111 and biased in the direction of the tab 126 of the housing 112 in which the plug is mounted, that is toward the outside of the plug along a radial line that extends from the longitudinal cedntroidal axis of the plug through the tab 126.

An apparatus of this invention may be useful to position each optical fiber end portion in the passageway of a plug segment 111. Such an apparatus 130 may be one which is shown in FIG. 15 and which may be used to position simultaneously each of a plurality of fiber end portions in the same orientation with respect to passageways in associated plugs. Each of a plurality of plug segments 111—111 which are mounted in housings 112—112 and which had been contiguous pairs from the same preform is positioned in a nest 132 in the apparatus 130. Each is positioned so that the tab 126 along each housing is received in a keyway 134 of the associated nest received therein. As can be seen in FIG. 15, the keyway 134 of each nest is oriented downwardly.

At this time, a curable adhesive material is injected by a syringe (not shown), for example, into each passageway. Such an adhesive may be UV-curable.

Then, an end portion of an optical fiber 21 which has had the coating 28 removed therefrom is inserted into one of the plug segments held in the apparatus 130. This step is repeated until each of the plugs is provided with adhesive and an end portion of an optical fiber in its passageway.

As can be seen in FIG. 15, the apparatus is provided with a plurality of pivotally mounted wire-like bails 138-138. Each bail 138 is arranged so that a central portion thereof spans transversely an aligned optical fiber end portion of an aligned nest. The bails are supported from pintles 142-142 attached to rod 144. A knob 146 is attached to an end of the rod 144. The bails are caused to be moved simultaneously pivotally by the turning of the knob 146 to engage the plurality of optical fibers adjacent to their entrances into the plugs and then moved further to move the optical fiber end portions in the passageways into engagement with the lowermost portions of the passageways. It should be remembered that in such a position, each optical fiber is oriented in the direction of the tab 126 on the exterior surface of the housing 112 of the plug segment. Because the tab 126 of each plug segment is in the same orientation with respect to the direction of any eccentricity of the passageway through the plug segment, the optical fiber end portion within the passageway of a plug segment is in the same orientation with respect to passageway eccentricity as is the optical fiber end portion within the passageway of another plug segment of the same tubular stock.

In a next step of making the connection, the adhesive material in each passageway is cured. The bails 138—138 are maintained in their moved positions, holding the optical fiber end portions in the lowermost portions of the passageways. Then the apparatus 130 is exposed to curing radiation such as UV energy to cure and harden the adhesive material in each passageway. As a result, each optical fiber end portion remains in its passageway in the same orientation with respect to the passageway.

It should be apparent that should the optical fibers be disposed in the plug passageways and biased toward the tabs 126-126, then the fibers each have the same orientation with respect to any eccentricity of the plug passageways relative to the centroidal axes of the plugs. In this embodiment, the direction of eccentricities has not been determined because the plug segments have the same rotational alignments relative to each other after separation from each other as before separation. the tab 126 of each may be in any orientation with respect to any eccentricity of its plug passageway; what is important is that both have the same orientation. As a result, the eccentricity component attributed to the eccentricity of an optical fiber end portion with respect to an oversize passageway in which it is positioned has been eliminated substantially.

Further, the invention is useful even if there is no passageway eccentricity. The invention allows the use of an oversize passageway as described hereinbefore and plug segments are arranged such that the optical fiber in the passageway of each has the same orientation with respect to the plug passageway.

The connection of the two optical fibers then is completed by inserting the two plug segments into a suitable alignment device. One such alignment device which is preferred is disclosed in priorly identified U.S. Pat. No. 4,545,644 which is incorporated by reference hereinto. The use of a prealigned rotary splice which includes the use of contiguous plug segments from the same tubular stock mounted in the alignment device of U.S. Pat. No. 4,545,644 is disclosed in priorly identified U.S. Pat. No. 4,691,986.

Figure 16:
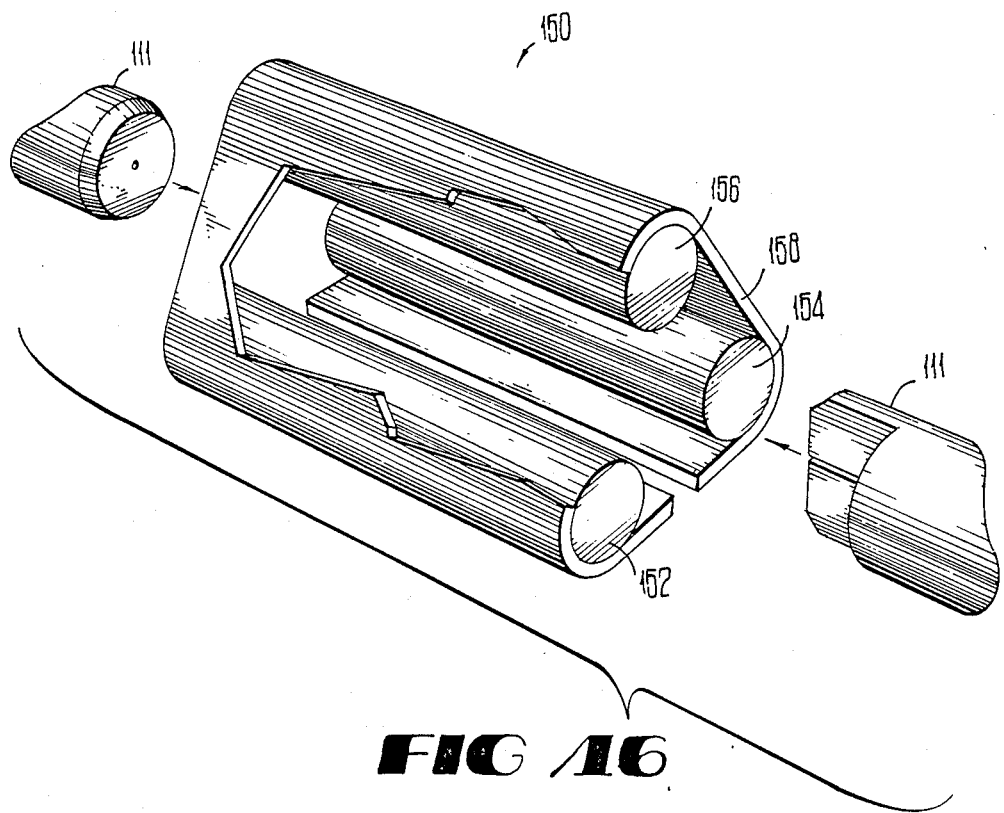
FIG. 16 shows schematically a three rod alignment means used in the connective arrangement of this invention.

A multi-rod alignment device 150 such as is shown in the above-identified U.S. Pat. No. 4,545,644 and 4,691,986 includes three cylindrical alignment rods 152, 154 and 156 which are held within a flexible clip 158 such that the rods engage the plugs after their insetion into the alignment means (see FIG. 16). It is desirable that the alignment rods have substantially the same coefficient of thermal expansion as the segments. The alignment rods 152, 154, and 156 may be turned to tune further the two plug segments 111—111 held within the alignment device 150.

Connectors according to the invention also comprise means for maintaining a constant axial relationship between the fiber ends after the insertion of the plugs into the alignment means. Facilities for doing this are well known in the art and are not disclosed herein. Such facilities may include an organizer into which the assembly of plug assemblies and alignment device 150 is inserted. The organizer is such that insertion of the assembly requires movement of each collar toward its associated housing and attendant compression of the associated spring. It should be understood that the axial relationship can be such that the plug end faces are in contacting relationship with each other or spaced apart with an index matching material therebetween.

The groove 101 (see FIG. 11) which is formed longitudinally along the tubular stock 90 prior to separation of the plug segments, e.g. 111 and 111, from the stock may be used to identify the angular relationship between the contiguous plugs. The groove facilitates the rotational alignment of the plugs without visual observation. For example, when using the alignment rods of U.S. Pat. No. 4,545,644, the first plug segment 111 is inserted among the alignment rods such that one of the rods contacts the first plug along its groove. After the second plug segment 111 is inserted, it is turned rotatably until the same alignment rod contacts the second plug along its groove. This latter alignment may be signaled by a click that occurs as the rod enters the groove.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber connector, which comprises:
   first and second plugs, each plug having an outer surface and a passageway therethrough for receiving an end portion of an optical fiber and each said passageway having a cross section transverse to a longitudinal axis of the plug which is significantly larger than that of the optical fiber to be received therein, each of said plugs comprising a segment of tubular stock with the segments of the tubular stock for said first and second plugs having been contiguous portions of the tubular stock and such that contiguous end faces of the two segments which have become said first and second plugs become adjacent free end faces of said first and second plugs;
   a first optical fiber having an end portion which is received in the passageway of said first plug and a second optical fiber having an end portion which is received in the passageway of said second plug, each of said fiber end portions being disposed in an associated passageway of an associated plug intentionally in the same orientation with respect to the associated passageway of the associated plug; and
   alignment means for maintaining the outer surface of said first plug aligned with the outer surface of said second plug and for causing the first and second plugs to have the same orientation with respect to each other as existed prior to separation from the tubular stock.

2. The optical fiber connector of claim 1, wherein each said fiber end portion is disposed in its associated passageway intentionally in the same orientation with respect to the direction of any eccentricity of the associated passageway from a centroidal axis of the associated plug.

3. The optical fiber connector of claim 1, wherein each said fiber end portion is disposed in its associated passageway in the same predetermined orientation with respect to the direction of any eccentricity of the passageway from a centroidal axis of the plug in which the passageway is formed.

4. The optical fiber connector of claim 3, wherein each said fiber end portion is disposed in its associated passageway in the direction of any eccentricity of the passageway from a centroidal axis of the plug in which the passageway is formed.

5. An optical fiber connector, which comprises:
   first and second cylindrical plugs each having a cylindrical passageway therethrough for receiving an end portion of an optical fiber, each said passageway having a cross section transverse to the longitudinal axis of the plug which is significantly larger than that of the optical fiber to be received therein, each of said plugs comprising a segment of tubular stock with the segments of the tubular stock for said first and second plugs having been contiguous portions of the tubular stock and such that contiguous end faces of the two portions of the tubular stock which have become said first and second plugs become adjacent free end faces of said first and second plugs which comprise said connector;
   a first optical fiber associated with said first plug and having an end portion which is received in the passageway of said first plug and a second optical fiber associated with said second plug and having an end portion which is received in the passageway of said second plug, each of said fiber end portions being disposed in an associated passageway of an associated plug intentionally in the same orientation with respect to the associated passageway in which the end portion is disposed; and
   alignment means for maintaining the outer cylindrical surface of said first plug substantially concentric with the outer cylindrical surface of said second plug and for causing the first and second plugs to have the same orientation with respect to each other as existed prior to separation from the tubular stock.

6. The connector of claim 5, wherein said alignment means is effective for maintaining the first plug in substantially fixed radial position relative to the second plug with the free end faces in opposed positions and said connector also includes means for maintaining said first plug in a substantially fixed axial position relative to said second plug.

7. The connector of claim 6, wherein said alignment means comprises a plurality of alignment rods each having a radius and said connector also includes means for maintaining the alignment rods and the plugs in continuous engagement with each other.

8. The connector of claim 5, wherein at least a portion of the length of tubular stock comprises a longitudinal groove formed along an outer surface thereof, the groove facilitating the identification of the rotational relationship of said first and second plugs.

9. The connector of claim 5, wherein each of said plug segments prior to separation from each other has a free end thereof received in a cavity of a housing, said housing including a large diameter portion and a small diameter portion, said housing having a passageway therethrough which is aligned with said passageway in its associated plug segment when said plug segment is mounted therein, each said housing also including a tab and said housings being assembled to said plug segments to cause the tabs on said housings to be aligned longitudinally.

10. The connector of claim 9, wherein each of the terminated optical fibers is secured within its associated passageway such that the fiber is aligned radially with the tab of the associated housing.

11. Terminated optical fibers adapted to be connected, said terminated optical fibers comprising:
first and second plugs, each having an outer surface and a passageway therethrough which is adapted to receive an end portion of an optical fiber and which has a cross section transverse to a longitudinal axis of the plug which is significantly larger than that of the optical fiber to be received therein, said first and second plugs each comprising a segment of tubular stock with the segments of the tubular stock for the two plugs having been contiguous portions of the tubular stock and such that contiguous end faces of the two portions of the tubular stock which are to become the first and second plugs to be connected become adjacent free end faces of the first and second plugs which are to be connected and such that the two plugs are capable of being connected so that they are in the same orientation with respect to each other as existed prior to separation from the length of tubular stock; and
two optical fibers each having an end portion which is received in the passageway of one of the plugs and which is disposed therein in a predetermined orientation with respect to the passageway of the plug in which it is received.

12. The terminated optical fiber of claim 11, which also includes a housing in which said each plug is mounted, said housing including a marking thereon and said optical fiber end portion being disposed in said passageway of said plug in a direction which extends radially through said marking.

13. A method of connecting optical fibers, said method including the steps of:
providing a first plug having a longitudinally extending passageway therethrough from a length of tubular stock, the passageway being adapted to receive an end portion of an optical fiber and having a transverse cross section which is significantly larger than the transverse cross section of the end portion of the optical fiber to be received therein;
providing a second plug having a longitudinally extending passageway therethrough from the length of tubular stock, the passageway being adapted to receive an end portion of an optical fiber and having a transverse cross section which is significantly larger than the transverse cross section of the end portion of the optical fiber to be received therein;
each of the plugs comprising a segment of tubular stock with the segments of the tubular stock for the first and second plugs having been contiguous portions of the tubular stock prior to separation from the tubular stock;
inserting an end portion of an optical fiber into the passageway of the first plug and an end portion of an optical fiber into the passageway of the second plug;
causing the end portion of the optical fiber in the passageway of the first plug to be in the same orientation with respect to the passageway as the optical fiber in the passageway of the second plug is with respect to the passageway of the second plug; and
causing the plugs to be aligned longitudinally and supported so that during connection of the plugs, contiguous end faces of the two segments of the tubular stock which have become the first and second plugs become free end faces of the first and second plugs in the same orientation with respect to each other as existed prior to separation from the length of tubular stock.

14. The method of claim 13 wherein each plug is provided from a cylindrical preform in which contiguous end faces prior to separation from the perform become adjacent end faces after termination of optical fibers and connection of the plugs, and causing the outer cylindrical surface of the first to be substantially concentric with the outer cylindrical surface of the second plug and with the direction of any eccentricity of each passageway of each plug falling in the same radial direction.

15. The method of claim 14, wherein each optical fiber is caused to be secured within its associated passageway so that the optical fiber is biased in a predetermined orientation with respect to the direction of any eccentricity of the associated passageway.

16. The method of claim 15, wherein the optical fiber is secured within the passageway of a plug provided from a preform in which contiguous end faces prior to separation from the preform become adjacent end faces after termination of optical fibers and termination of the optical fibers in the plugs is such that each optical fiber is biased in the direction of any eccentricity of the associated passageway.

17. The method of claim 14, wherein prior to separation from the preform, a free end portion of each plug portion is assembled to a housing which includes a tab, the assembly being accomplished to cause the tabs to be aligned longitudinally.

18. The method of claim 17, wherein the optical fibers are secured in the passageways to cause each fiber to be biased in the radial direction of the tab of the associated housing.

19. A method of preparing optical fibers for interconnection, said method including the steps of:
providing a first plug having a longitudinally extending passageway therethrough from a length of tubular stock, the passageway being adapted to receive an end portion of an optical fiber and having a transverse cross section which is significantly larger than the transverse cross section of the end portion of the optical fiber to be received therein;
providing a second plug having a longitudinally extending passageway therethrough from a length of tubular stock, the passageway being adapted to receive an end portion of an optical fiber and having a transverse cross section which is significantly larger than the transverse cross section of the end portion of the optical fiber to be received therein;
each of the plugs comprising a segment of tubular stock with the segments of tubular stock for the first and second plugs having been contiguous portion of the tubular stock prior to separation from the tubular stock and wherein contiguous end faces of plug segments prior to separation become adjacent end faces in a connection;
inserting an end portion of an optical fiber into the passageway of the first plug and an end portion of an optical fiber into the passageway of the second plug; and
causing the end portion of the optical fiber in the passageway of the first plug to be in the same orientation with respect to the passageway as the optical fiber in the second passageway.

20. The method of claim 19, wherein each of at least two plugs is provided from a preform such that contiguous end faces of plug portions prior to separation becomes adjacent end faces in a connection.

21. The method of claim 19 such that prior to separation of two adjacent plug segments from each other, a free end portion of each plug segment is mounted in a housing having a tab such that the tabs of the two housings are aligned longitudinally.

22. The method of claim 19, wherein each fiber is secured within an associated passageway to cause the fiber to be biased in the radial direction of the tab of the associated housing.

23. A method of terminating two optical fibers to be connected, said method including the steps of:

provshalling from a length of tubular stock two plugs each having a passageway formed in a direction along a longitudinal centroidal axis of the plug, the passageway being adapted to receive an end portion of an optical fiber and having a transverse cross section which is significantly larger than a transverse cross section of the end portion of the optical fiber to be received therein;

providing means for identifying the orientation of each plug with respect to a longitudinal axis of the tubular stock prior to separation from the length of tubular stock;

inserting an end portion of an optical fiber into the passageway of one plug;

causing the end portion of the optical fiber to be disposed in the passageway of the one plug in in engagement with a portion of the wall of the one plug which defines the passageway;

providing means for identifying the radial direction from the longitudinal axis of the plug through the longitudinal centroidal axis of the optical fiber;

inserting an end portion of another optical fiber into the passageway of the other plug;

causing the end portion of the other optical fiber to be disposed in the passageway of the other plug in engagement with a portion of the wall of the other plug which defines the passageway and which prior to separation of the plugs from the tubular stock is aligned with the portion of the wall of the one plug; and providing means for identifying the radial direction from the longitudinal axis of the other plug through the longitudinal centroidal axis of the optical fiber therein so that when the two plugs are connected together, the identifying means may be aligned.

* * * * *